US008819296B2

(12) United States Patent
Setlur et al.

(10) Patent No.: US 8,819,296 B2
(45) Date of Patent: Aug. 26, 2014

(54) APPARATUS, A METHOD AND A COMPUTER PROGRAM

(75) Inventors: Vidya Setlur, Portola Valley, CA (US); Raja Bose, Mountain View, CA (US); Vivek Shrivastava, Sunnyvale, CA (US); Hawk-yin Pang, San Jose, CA (US)

(73) Assignee: Nokia Corporation, Espoo (FI)

( * ) Notice: Subject to any disclaimer, the term of this patent is extended or adjusted under 35 U.S.C. 154(b) by 262 days.

(21) Appl. No.: 13/298,878

(22) Filed: Nov. 17, 2011

(65) Prior Publication Data

US 2013/0132611 A1 May 23, 2013

(51) Int. Cl.
*G06F 3/00* (2006.01)
*G06F 13/28* (2006.01)

(52) U.S. Cl.
CPC ........................................ *G06F 3/00* (2013.01)
USPC ................................... 710/5; 710/14; 710/16

(58) Field of Classification Search
USPC ............................................................. 710/5
See application file for complete search history.

(56) References Cited

U.S. PATENT DOCUMENTS

| 5,649,032 A | 7/1997 | Burt et al. |
| 2005/0068339 A1 | 3/2005 | Lipsky et al. |
| 2006/0161621 A1 | 7/2006 | Rosenberg |
| 2007/0252834 A1 | 11/2007 | Fay |
| 2008/0181498 A1 | 7/2008 | Swenson et al. |
| 2008/0216125 A1 | 9/2008 | Li et al. |
| 2009/0213032 A1 | 8/2009 | Newport et al. |
| 2009/0273560 A1 | 11/2009 | Kalanithi et al. |
| 2010/0088630 A1 | 4/2010 | Morris |
| 2011/0090224 A1 | 4/2011 | Woo et al. |
| 2011/0138416 A1 | 6/2011 | Kang et al. |
| 2012/0038679 A1 | 2/2012 | Yun et al. |
| 2012/0146884 A1 | 6/2012 | Wang et al. |
| 2012/0176396 A1* | 7/2012 | Harper et al. ................. 345/589 |
| 2012/0194487 A1* | 8/2012 | Roethig et al. ............... 345/204 |
| 2012/0262379 A1* | 10/2012 | King ............................. 345/173 |

OTHER PUBLICATIONS

Arne Schmitz, et al, "Ad-hoc Multi-Displays for Mobile Interactive Applications": (http://www.graphics.rwth-aachen.de/uploads/media/schmitz_2010_egarea_01.pdg, Eurographics 2010, vol. 29 (2010), No. 8 pgs.

Kent Lyons, et al, "Multi-display Composition: Supporting Display Sharing for Collocated Mobile Devices" (http://berkeley.intel-research.net/%7Ebrosario/papers/interact09.pdf, 14 pgs., 2009.

* cited by examiner

*Primary Examiner* — Henry Tsai
*Assistant Examiner* — Dean Phan
(74) *Attorney, Agent, or Firm* — Harrington & Smith

(57) ABSTRACT

An apparatus includes one local input/output device; and an interface configured to interface between an application hosted by the apparatus and the local input/output device and is configured to interface between the application hosted by the apparatus and a remote input/output device hosted by another apparatus; wherein the interface has a first state in which the interface is configured to couple the application and the local input/output device but not couple the application and the remote input/output device hosted by the another apparatus; wherein the interface has a second state in which the interface is configured to couple the application and the local input/output device and to couple the application and the remote input/output device hosted by another apparatus; and wherein the interface is configured to be responsive to a proximity detection trigger.

18 Claims, 4 Drawing Sheets

APPARATUS, A METHOD AND A COMPUTER PROGRAM

TECHNOLOGICAL FIELD

Embodiments of the present invention relate to an apparatus, a method and a computer program. In particular, they relate to sharing input/output devices.

BACKGROUND

It would be desirable to enable an apparatus to access the resources of another apparatus. The resources may, for example, be locally stored data and/or local input/output devices.

BRIEF SUMMARY

According to various, but not necessarily all, embodiments of the invention there is provided an apparatus comprising: at least one local input/output device; and an interface that is configured to interface between at least one application hosted by the apparatus and the at least one local input/output device and is configured to interface between the at least one application hosted by the apparatus and at least one remote input/output device hosted by another apparatus; wherein the interface has a first state in which the interface is configured to couple the application and the least one local input/output device but not couple the application and the at least one remote input/output device hosted by the another apparatus; wherein the interface has a second state in which the interface is configured to couple the application and the least one local input/output device and to couple the application and the at least one remote input/output device hosted by another apparatus; and wherein the interface is configured to be responsive to a proximity detection trigger, indicative that the another apparatus hosting the remote input/output device is available to be coupled to by the interface, to change its state from the first state to the second state.

According to various, but not necessarily all, embodiments of the invention there is provided a method comprising: coupling an application and at least one local input/output device hosted by a local apparatus but not coupling the application and at least one remote input/output device hosted by another apparatus; and in response to a proximity detection trigger, indicative that the another apparatus hosting the remote input/output device is available to be coupled to, coupling the application and the at least one local input/output device hosted by a local apparatus and coupling the application and the at least one remote input/output device hosted by the another apparatus.

According to various, but not necessarily all, embodiments of the invention there is provided an apparatus comprising: at least one processor; and at least one memory including computer program code the at least one memory and the computer program code configured to, with the at least one processor, cause the apparatus at least to perform coupling an application and at least one local input/output device hosted by a local apparatus but not coupling the application and at least one remote input/output device hosted by another apparatus; and in response to a proximity detection trigger, indicative that the another apparatus hosting the remote input/output device is available to be coupled to, coupling the application and at least one local input/output device hosted by a local apparatus and coupling the application and the at least one remote input/output device hosted by another apparatus.

The fact that the interface is configured to be responsive to a proximity detection trigger (indicative that the another apparatus hosting the remote input/output device is available to be coupled to by the interface) to change its state from the first state to the second state, enables the application at the apparatus to use the remote input/output resources at the another apparatus when available.

The use of the interface allows the application to be a pre-existing legacy application. That is the interface can, in the second state, interface legacy applications to the remote input/output devices.

BRIEF DESCRIPTION

For a better understanding of various examples of embodiments of the present invention reference will now be made by way of example only to the accompanying drawings in which:

FIG. 1 schematically illustrates a system comprising an apparatus and another apparatus;

DETAILED DESCRIPTION

Figure 1:
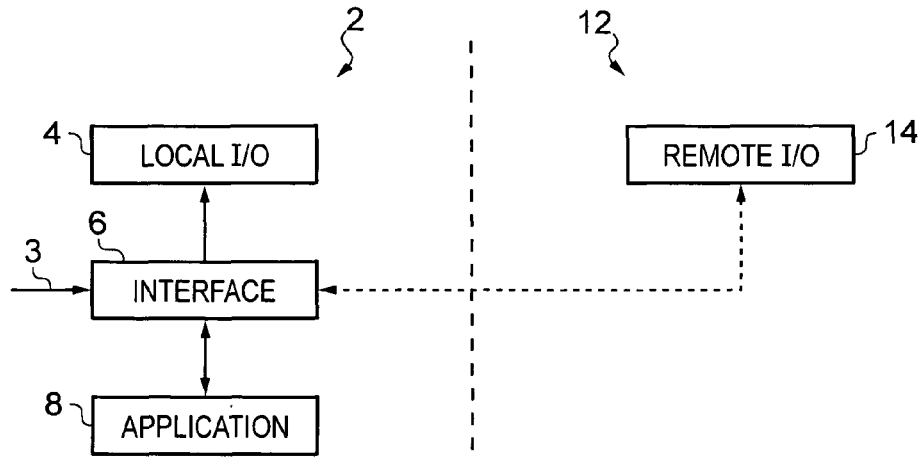

The Figures illustrate an apparatus 2 comprising: at least one local input/output device 4; and an interface 6 that is configured to interface between at least one application 8 hosted by the apparatus 2 and the at least one local input/output device 4 and is configured to interface between the at least one application 8 hosted by the apparatus 2 and at least one remote input/output device 14 hosted by another apparatus 12; wherein the interface has a first state 20 in which the interface 6 is configured to couple the application 8 and the least one local input/output device 4 but not couple the application 8 and the at least one remote input/output device 14 hosted by the another apparatus 12; wherein the interface 6 has a second state 22 in which the interface 6 is configured to couple the application 8 and the least one local input/output device 4 and to couple the application 8 and the at least one remote input/output device 14 hosted by the another apparatus 12; and wherein the interface 6 is configured to be responsive to a proximity detection trigger 3, indicative that the another apparatus 12 hosting the remote input/output device 14 is available to be coupled to by the interface 6, to change its state from the first state 20 to the second state 22.

FIG. 1 schematically illustrates a system comprising an apparatus 2 and another apparatus 12.

The apparatus 2 provides an application 8 and the apparatus 2 comprises a local input/output device 4 and an interface 6.

The term 'input/output device' is a class of devices that includes input-only devices, output-only devices and input and output devices.

The interface 6 is configured to interface between the application 8 hosted by the apparatus 2 and the local input/output device 4. The interface 6 is also configured to interface between the application 8 hosted by the apparatus 2 and a remote input/output device 14 hosted by the another apparatus 12.

The interface 6 is configured to be responsive to a proximity detection trigger 3, indicative that the another apparatus 12 hosting the remote input/output device 14 is available to be coupled to by the interface 6, to change its state from a first state 20 to a second state 22. The interface 6 may be configured to be responsive automatically to the proximity detection trigger 3.

Figure 2A:
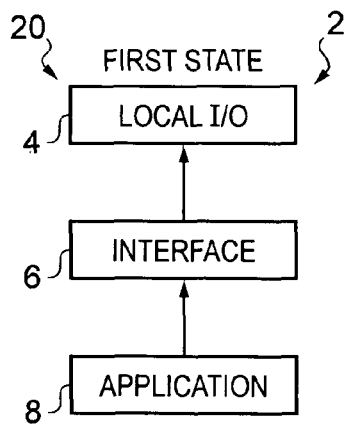
FIG. 2A illustrates an interface, in a first state, configured to couple an application and the local input/output device but not couple the application and a remote input/output device hosted by the another apparatus.

Referring to FIG. 2A, in the first state 20, the interface 6 is configured to couple the application 8 and the local input/output device 4 but not couple the application 8 and the remote input/output device 14 hosted by the another apparatus 12.

Figure 2B:
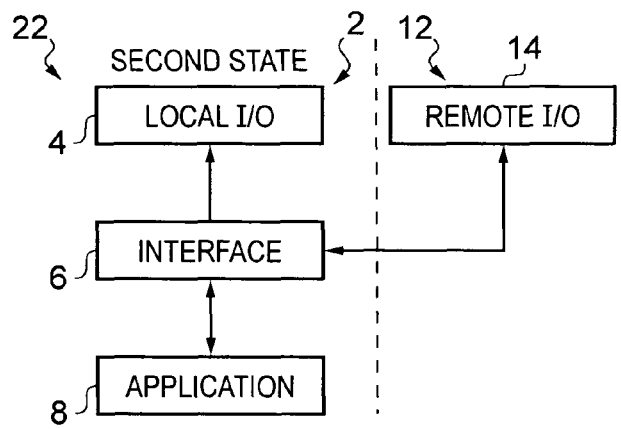
FIG. 2B illustrates the interface, in a second state, configured to couple the application and the local input/output device and to couple the application and the remote input/output device hosted by the another apparatus.

Referring to FIG. 2B, in the second state 22, the interface 6 is configured to couple the application 8 and the local input/output device 4 and to couple the application 8 and the remote input/output device 14 hosted by the another apparatus 12.

Figure 3:
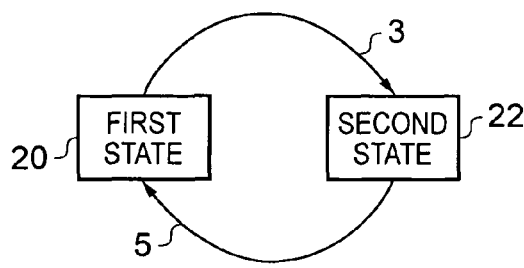
FIG. 3 illustrates a state transition diagram for the interface.

FIG. 3 illustrates that a proximity detection trigger 3 causes the state of the interface 6 to change automatically from a first state 20 to a second state 22.

The proximity detection trigger 3 is indicative that the another apparatus 12 hosting the remote input/output device 14 is available to be coupled to by the interface 6.

FIG. 3 also illustrates that a trigger 5 causes the state of the interface 6 to change from the second state 22 to the first state 20. The trigger 5 is indicative that the another apparatus 12 hosting the remote input/output device 14 is no longer available to be coupled to by the interface 6.

Figure 4:
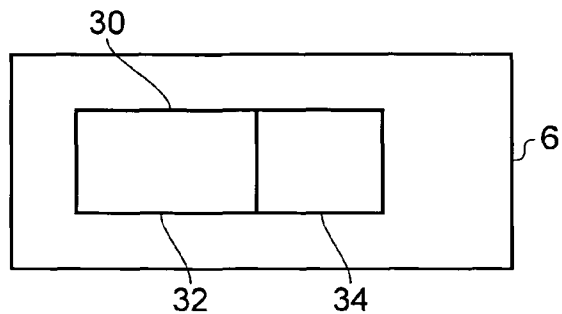
FIG. 4 illustrates an input/output buffer for the apparatus that is configured to buffer data.

Referring to FIG. 4, the interface 6 comprises or controls an input/output buffer 30 for the apparatus 2 that is configured to buffer data.

The term 'input/output buffer' is a class of buffers that includes input-only buffers, output-only buffers and a combination of input buffer and output buffer.

During the first state 20, the input/output buffer 30 is configured to buffer data for the local input/output device 4 but not for the remote input/output device 14 hosted by the another apparatus 12

During the second state 22, the input/output buffer 30 is configured to buffer data for the local input/output device 4 and the remote input/output device 14 hosted by the another apparatus 12. The input/output buffer 30 may be configured to buffer data in a first reserved portion 32 for the local input/output device 4 and in a second reserved portion 34 for the remote input/output device 14.

The second reserved portion 34 may provide an input/output buffer directly accessed by the another apparatus 12 instead of an input/output buffer local to the another apparatus 12.

A size of the second reserved portion 34 may be controllable. For example, the size of the second reserved portion 34 may depend upon the characteristics of the remote input/output device 14.

The local input/output device 4 may be a first display and the remote input/output device 14 may be a second display. The input/output buffer 30 is then a display frame buffer. A size of the second reserved portion 34 may be controllably changed in dependence upon a resolution of the second display.

Figure 5:
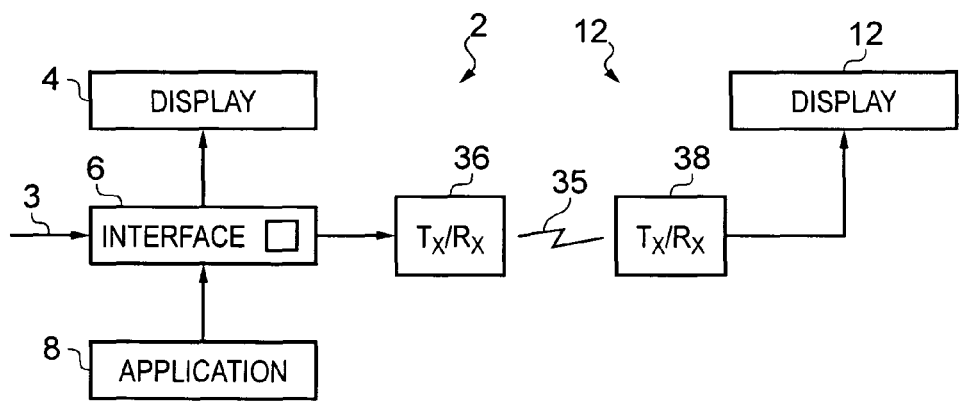
FIG. 5 illustrates a system similar to but different to that illustrated in FIG. 1.

FIG. 5 illustrates an example of a system similar to that illustrated in FIG. 1. However, in this example, the local input/output device 4 is a first display and the remote input/output device 14 is a second display.

Also, in this example, communication between the apparatus 2 and the another apparatus 12 is via a wireless communications link 35. The apparatus 2 comprises a wireless transceiver 36 and the another apparatus 12 comprises a wireless transceiver 12. The wireless transceivers 36, 38 create and maintain the wireless link.

The wireless link may, for example, use an ad-hoc wireless channel for communicating.

The wireless link may, for example, be a Bluetooth link, a wireless USB link, a wireless local area network (WLAN) link, an ultra wideband (UWB) link, a near-field communication (NFC) link etc.

An apparatus 2 comprises a local display 4 and an interface 6 that is configured to interface between the application 8 hosted by the apparatus 2 and the local display 4 and is configured to interface between the application 8 hosted by the apparatus 2 and the remote display 14 hosted by the another apparatus 12.

When the interface 6 is in the first state 20, the interface 6 is configured to couple the application 8 and the local display 4 but not couple the application 8 and the remote display 14 hosted by the another apparatus 12. The application 8 is therefore able to control the local display 4 but not the remote display 14.

When the interface 6 is in the second state 22, the interface 6 is configured to couple the application 8 and the local display 4 and to couple the application 8 and the remote display 14 hosted by the another apparatus 12. The application 8 is therefore able to control the local display 4 and the remote display 14 simultaneously. A whole or part of a single piece of content may be displayed by displaying a portion on the local display 4 and a different, non-overlapping, potion on the remote display 14.

The interface 6 is configured to be responsive to a proximity detection trigger 3, indicative that the another apparatus 12 hosting the remote display 14 is available to be coupled to by the interface 6, to change its state from the first state 20 to the second state 22.

The proximity detection trigger 3 may, for example, be created when the apparatus 2 and the another apparatus abut.

In the second state 22, the interface 6 is configured to control the local display 4 to display first content C0 and the remote display 14 to display second content CN (N=1, 2, 3, 4)

different to the first content C0, The first content C0 and second content CN may form different portions of a continuum of content C.

Figure 6A:
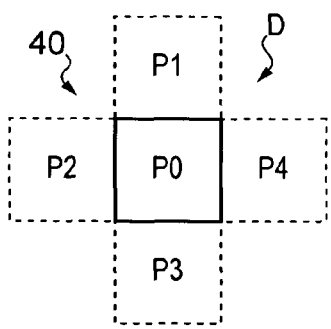
FIG. 6A illustrates that an interface may be configured to generate a viewing map.

Referring to FIG. 6A, the interface 6 is configured to generate a viewing map 40. The viewing map 40 is a logical display D formed from the combination of the local display at position P0 and the remote display at position PN (N=1, 2, 3, 4).

Figure 6B:
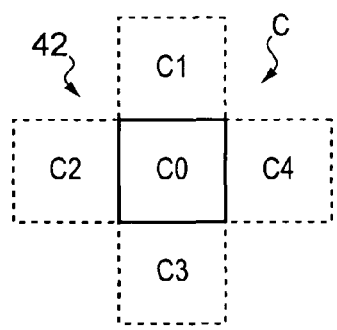
FIG. 6B illustrates that the interface may be configured to map display output data from the application to a memory map corresponding to the viewing map.

Referring to FIG. 6B, the interface 6 is configured to map display output data from the application 8 to a memory map 42 corresponding to the viewing map 40. The memory map 42 provides a virtual frame buffer comprising a first portion C0 for use as a frame buffer by the first display 4 and a second portion CN for use as frame buffer by the second display 14. The first content C0 and second content CN form content for theological display D.

The viewing map 40 is dependent upon: relative positions and orientations of the local display 4 and the remote display 14 and relative sizes (resolutions) of the local display 4 and the remote display 14.

The position, orientation, size resolution) of the second display may be provided to the interface 6 via the proximity detection trigger 3.

In this example, the local display at position P0 and the remote display at position PN are rectangles of the same size having height h and width w. P0 has a relative position (0.0). The positions P1, P2, P3, P4 relative to the position P0 are (0, h), (−w, 0), (0, −h) and (w, 0). The remote display at position PN is therefore contiguous with the local display at position P0. In this example, the local display content C0 and the remote display content CN are rectangles of the same size having height h and width w. C0 has a relative position (0.0). The positions of content C1, C2, C3, C4 relative to the position of content C0 are (0, h), (−w, 0), (0, −h) and (w, 0). The remote content CN is therefore contiguous with the local content C0.

As the first content C0 and second content CN may form different portions of a continuum of content C, differences in how the local display 4 and the remote display 14 display the content should be minimised. The interface 6, in the second state, may be configured to control settings of the apparatus 2 and the another apparatus 12 to provide conformance. For example, the interface 6, in the second state, may be configured to control settings of the apparatus 2 and the another apparatus 12 to provide brightness matching and chrominance matching between the local display 4 of the apparatus 2 and the remote display 4 of the another apparatus 12.

Figure 7:
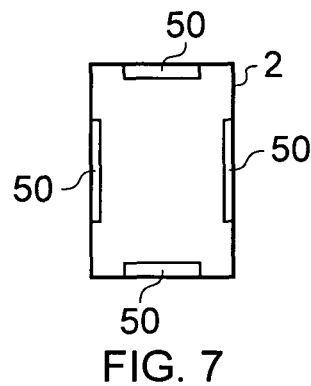
FIG. 7 illustrates an example of an apparatus with a plurality of proximity detectors.

FIG. 7 illustrates an example of an apparatus 2 with a plurality of proximity detectors 50. In this example, the proximity detectors are located at extremities of the apparatus 2. A proximity detector 50 is configured to detect when another apparatus 12 hosting a remote input/output device 14 is available to be coupled to by the interface 6 of the apparatus 2 and consequently provide the proximity detection trigger 3.

A proximity detector 50 may, for example, be a contact detector that detects abutment. or interconnection.

A proximity detector 50 may, for example, be a wireless detector that detects proximity such as, for example, a near field communications (NFC) device.

The proximity detector 50 may, for example, enable communication between the apparatus 2 and the another apparatus 12. The transceiver 36 may, for example, be a proximity detector 50.

Where the proximity detector 50 enables communication between the apparatus 2 and the another apparatus 12, the proximity detection trigger may comprise a message produced in response to a proximity event. The message may have a standard format for conveying characteristics of the remote input/output device 14 hosted by the another apparatus 12. The characteristics of the remote input/output device 14 hosted by the another apparatus 12 may, for example, comprise: position information, orientation information, display size (resolution) information. This information enables the viewing map 40 (FIG. 6A) to be generated. The message may additionally comprise conformance information that enables brightness matching, contrast matching and/or chrominance matching between the local display 4 of the apparatus 2 and the remote display 4 of the another apparatus 12.

The proximity event may in some but not necessarily all embodiments comprise physical contact of the apparatus 2 and the another apparatus 12 but not physical interconnection of the apparatus 2 and another apparatus 12.

A proximity event may, for example, involving bumping the apparatus 2 and the another apparatus 12, placing the apparatus 2 on the another apparatus 12, etc.

Figure 13A:
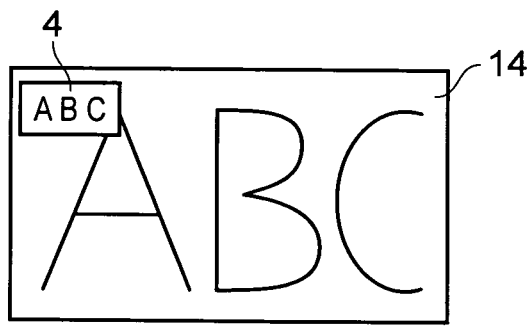
FIGS. 13A, 13B and 13C illustrate an example where a proximity detection event is placing the apparatus onto a display of the another apparatus.
Figure 13B:
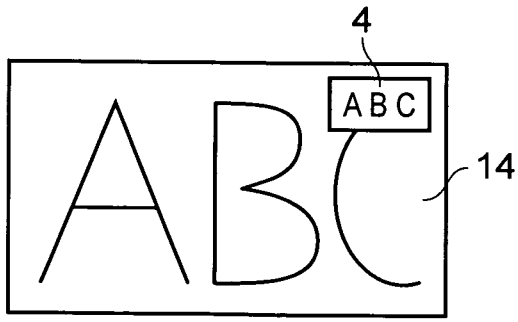
Figure 13C:
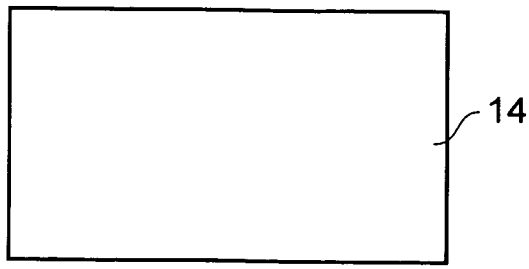

FIGS. 13A, 13B and 13C illustrate an example where the proximity detection event is placing the apparatus 2 onto a display 14 of the another apparatus 12. In this example, a display 4 of the apparatus 2 is significantly smaller than a display 14 of the another apparatus 12. When the apparatus 2 is placed onto the another apparatus 12, the content (e.g. ABC) displayed on the display 4 of the apparatus 2 is transferred to the display 14 of the another apparatus 12. As shown in FIGS. 13A and 13B, the apparatus 2 may be positioned anywhere on the display 14. As shown in FIG. 13C, when the apparatus 2 is removed from the display 14, the display 14 no longer displays the content (ABC) displayed on the display 4 of the apparatus 2.

Referring back to FIG. 1, the application 8 may be configured to receive first input commands from a first user input device and to receive second input commands from a second user input device. However, the local input/output device 4 of the apparatus 2 may comprise only the first user input device but not the second user input device.

The interface 6 may be configured, in the second state, to enable use of the second user input device 14 of the another apparatus 12 to control the apparatus 2. For example, if the remote input/output device 14 of the another apparatus 12 comprises the second user input device, then the interface 6 is configured, in the second state, to enable the second user input device 14 of the another apparatus 12 to control the application 8 of the apparatus 2.

The interface 6 may also be configured, in the second state, to enable use of the first user input device 4 of the apparatus 2 to control the another apparatus 4.

Figure 8:
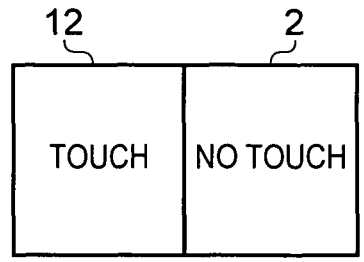
FIG. 8 illustrates a system in which the apparatus does not support touch input but the another apparatus does.

In FIG. 8, the apparatus 2 does not support touch input but the another apparatus 12 does. In this example, touch input provided at the another apparatus 12 may be used to control the application 8 at the apparatus 2.

Figure 9:
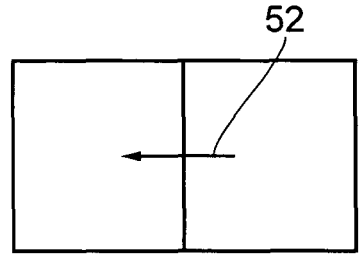
FIG. 9 illustrates a system in which the interface is configured to enable a user input actuation for the application to be initiated at one of the apparatuses and terminated at the other one of the apparatuses.
Figure 10:
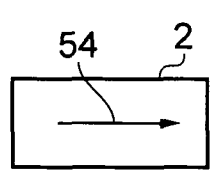
FIG. 10 illustrates a system in which the interface is configured to enable a user input actuation for the application to be initiated at one of the apparatuses and terminated at the other one of the apparatuses.
Figure 10:
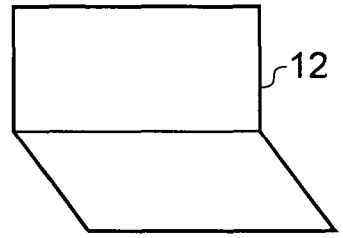

In FIGS. 9 and 10 the interface 6 is configured to enable a user input actuation for the application to be initiated at one of the apparatuses 2, 12 and have effect at the other one of the apparatuses 12, 2.

The input/output buffer 30 for the apparatus 2 may be a common input buffer shared by the apparatus 2 and the another apparatus 12 when the interface 6 of the apparatus 2 is in the second state.

Referring to FIG. 9, the interface 6 is configured to enable a user input actuation 52 for the application 8 to be initiated at one of the apparatus and terminated at the other one of the apparatuses. In FIG. 9, a trace 52 is started on a touch input screen 4 of the apparatus 2 and continued across onto a touch input screen 14 of the remote apparatus 14. A trace 52 may also be performed in the reverse direction. The trace 52 may, for example, be used for navigating or moving objects. It may, for example, be used to transfer or copy a data object symbolized by an icon movable by the trace 52 from one apparatus 2 to the another apparatus 12.

Referring to FIG. 10, the interface 6 is configured to enable a user input actuation 54 for the application 8 to be initiated at one of the apparatus 2 and terminated at the other one 12 of the apparatuses. The user input actuation 54 is flicking an icon on a display 4 of the apparatus 2 towards the another apparatus 12 and the effect at the another apparatus 12 is storage of data represented by the icon at the another apparatus 12.

Figure 11:
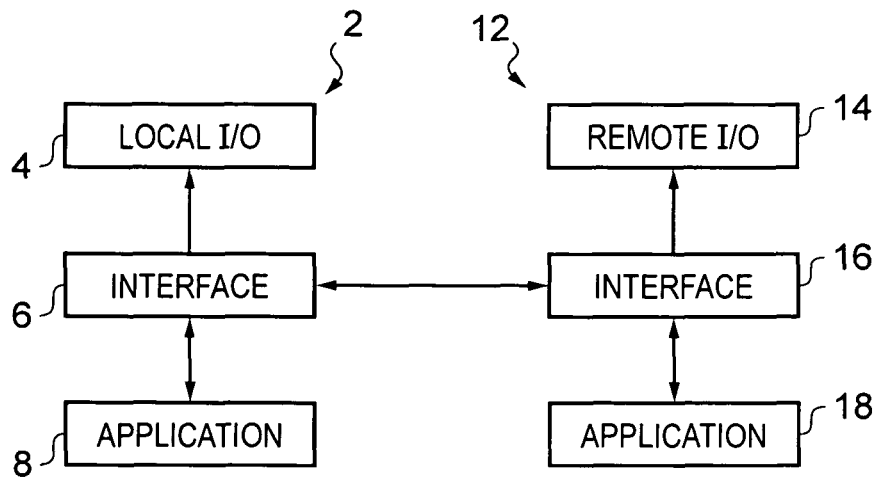
FIG. 11 illustrates a system similar to but different to that illustrated in FIG. 1.

FIG. 11 illustrates a system similar to that illustrated in FIG. 1. In this example, the apparatus 12 is similar to the apparatus 2. It provides an application 18 and the apparatus 12 comprises the local input/output device 14 and also an interface 16.

The interface 6 of the apparatus 2 communicates with the interface 16 of the apparatus 12.

The interface 6, in the second state, is configured to couple the application 8 and the local input/output device 4 and to couple a remote application 18 hosted by the another apparatus 12 and the remote input/output device hosted by the another apparatus. The interface 6, in the second state, is additionally configured to synchronize the application 8 and the another application 18.

Thus, for example, the apparatus 2 may display a local calendar in a local display 2 and the apparatus 12 may display a remote calendar in the display 12. The apparatus 2 may allow a user to copy items from one calendar to the other or may enable automatic copying of items between the calendars.

Implementation of the interface 6, in any of the embodiments, can be in hardware alone (a circuit, a processor . . . ), have certain aspects in software including firmware alone or can be a combination of hardware and software (including firmware).

The interface 6 may, for example, be implemented using instructions that enable hardware functionality, for example, by using executable computer program instructions in a general-purpose or special-purpose processor that may be stored on a computer readable storage medium (disk, memory etc) to be executed by such a processor.

Figure 12:
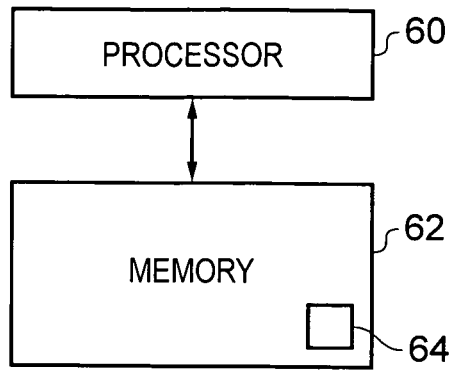
FIG. 12 illustrates one example of an interface.

Referring to FIG. 12, the processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions that control the operation of the apparatus 2 when loaded into the processor 60. The computer program instructions 64 provide the logic and routines that enables the apparatus to perform the methods described. The processor 60 by reading the memory 62 is able to load and execute the computer program 64.

The apparatus therefore comprises: at least one processor; and at least one memory including computer program code the at least one memory and the computer program code configured to, with the at least one processor, cause the apparatus at least to perform:

The computer program 64 may arrive at the apparatus 2] via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 64. The apparatus 2 may propagate or transmit the computer program 64 as a computer data signal.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The interface 6 may be a module.

The blocks illustrated in the Fig may represent steps in a method and/or sections of code in the computer program 64. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example although the systems describe above involve an apparatus 2 and a single another apparatus 12, in other embodiments the interface 6 of the apparatus 2 can simultaneously couple the application 8 to multiple different input/output devices 12 hosted by multiple, different apparatuses 2. Where the multiple different input/output devices are displays, they may be tessellated with the display 4 of the apparatus 2 to form a large logical display formed from the multiple different displays.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    at least one local input/output device; and
    an interface that is configured to interface between at least one application hosted by the apparatus and the at least one local input/output device and is configured to interface between the at least one application hosted by the apparatus and at least one remote input/output device hosted by another apparatus;
    wherein the interface has a first state in which the interface is configured to couple the application and the least one local input/output device but not couple the application and the at least one remote input/output device hosted by the another apparatus;
    wherein the interface has a second state in which the interface is configured to couple the application and the least one local input/output device and to couple the application and the at least one remote input/output device hosted by another apparatus;
    wherein the interface is configured to be responsive to a proximity detection trigger, indicative that the another apparatus hosting the remote input/output device is available to be coupled to by the interface, to change its state from the first state to the second state;
    wherein the proximity detection trigger comprises a message produced in response to a proximity event;
    wherein the message has a standard format for conveying characteristics of the remote input/output device hosted by the another apparatus;
    wherein the characteristics of the remote input/output device hosted by the another apparatus comprise: position information, orientation information, display size information and display resolution information;
    wherein the at least one local input/output device comprises a first display and the at least one remote input/output device comprises a second different display; and
    wherein the interface in the second state is configured to generate a viewing map comprised of first content of the first display and second content of the second display, wherein the second content is different to the first content; and wherein the viewing map is a logical display formed from a combination of at least the first content of the first display and the second content of the second display and wherein at least one of the first content and the second content is dependent on the relative positions of the first display and the second display.

2. The apparatus of claim 1,
    wherein in the first state an input/output buffer for the apparatus is configured to buffer data for the at least one local input/output device but not for the at least one remote input/output device hosted by another apparatus, and
    wherein in the second state an input/output buffer for the apparatus is configured to buffer data for the at least one local input/output device and the at least one remote input/output device hosted by the another apparatus.

3. The apparatus of claim 2,
    wherein in the second state the input/output buffer for the apparatus is configured to buffer data in a first reserved portion for the at least one local input/output device and in a second reserved portion for the at least one remote input/output device hosted by the another apparatus, and
    wherein the second reserved portion for the at least one remote input/output device hosted by another apparatus, provides an input/output buffer used by the another apparatus.

4. The apparatus of claim 3, configured to change the size of the second reserved portion of the input/output buffer in dependence upon one or more relative characteristics of the at least one local input/output device and the at least one remote input/output device.

5. The apparatus of claim 2, wherein the input/output buffer for the apparatus is a common input buffer shared by the apparatus and the another apparatus when the apparatus is in the second state.

6. The apparatus of claim 1,
    wherein the interface is configured to map display output data from the application to a memory map corresponding to the viewing map, wherein the memory map provides a virtual frame buffer comprising a first portion for use as frame buffer by the first display and a second portion for use as frame buffer by the second display.

7. The apparatus of claim 6, wherein the viewing map is also dependent upon one or more parameters selected from the group comprising:
    relative orientations of the first display and the second display, relative sizes of the first display and second display and relative resolutions of the first display and second display.

8. The apparatus of claim 7, wherein information for determining the one or more parameters is provided via the proximity detection trigger.

9. The apparatus of claim 1, wherein the interface, in the second state, is configured to control settings of the apparatus and the another apparatus to provide brightness matching and chrominance matching between a local display of the apparatus and a remote display of the another apparatus.

10. The apparatus of claim 1,
    wherein application is configured to receive first input commands from a first user input device and to receive second input commands from a second user input device and wherein the at least one local input/output device of the apparatus comprises the first user input device but not the second user input device, and
    wherein the at least one remote input/output device of the another apparatus comprises the second user input device and wherein the interface is configured, in the second state, to enable use of the second user input device of the another apparatus to control the apparatus.

11. The apparatus of claim 10, wherein the interface is configured to enable a user input actuation for the application to be initiated at one of the apparatus and have effect at the other one of the apparatus and the another apparatus.

12. The apparatus of claim 10, wherein the interface is configured to enable a user input actuation for the application to be initiated by a user at one of the apparatus and another apparatus and terminated by the user at the other one of the apparatus and the another apparatus.

13. The apparatus of claim 1,
wherein application is configured to receive first input commands from a first user input device and to receive second input commands from a second user input device,
wherein the at least one local input/output device of the apparatus comprises the first user input device but not the second user input device, and
wherein the at least one remote input/output device of the another apparatus comprises the second user input device and wherein the interface is configured, in the second state, to enable use of the first user input device of the apparatus to control the another apparatus.

14. The apparatus of claim 1,
wherein the interface, in the second state, is configured to couple the application and the least one local input/output device and to couple a remote application hosted by the another apparatus and the at least one remote input/output device hosted by the another apparatus, and
wherein the interface, in the second state, is additionally configured to synchronize the application and the another application.

15. The apparatus of claim 1, wherein the relative positions of the first display and the second display are defined by a lateral offset between the first display and the second display and by a vertical offset between the first display and the second display.

16. A method comprising:
coupling an application and at least one local input/output device hosted by a local apparatus but not coupling the application and at least one remote input/output device hosted by another apparatus;
in response to a proximity detection trigger, indicative that the another apparatus hosting the remote input/output device is available to be coupled to, coupling the application and the at least one local input/output device hosted by a local apparatus and coupling the application and the at least one remote input/output device hosted by the another apparatus,
wherein the at least one local input/output device comprises a first display and the at least one remote input/output device comprises a second, different display,
wherein the proximity detection trigger comprises a message produced in response to a proximity event,
wherein the message has a standard format for conveying characteristics of the remote input/output device hosted by the another apparatus,
wherein the characteristics of the remote input/output device hosted by the another apparatus comprise: position information, orientation information, display size information and display resolution information; and
generating a viewing map comprised of first content of the first display and second content of the second display, wherein the second content is different to the first content, wherein the viewing map is a logical display formed from a combination of at least the first content of the first display and the second content of the second display and wherein at least one of the first content and second content is dependent on the relative positions of the first display and the second display.

17. The method of claim 16,
wherein coupling an application and at least one local input/output device hosted by a local apparatus but not coupling the application and at least one remote input/output device hosted by another apparatus comprises buffering data for the at least one local input/output device but not for the at least one remote input/output device hosted by another apparatus; and
wherein coupling the application and at least one local input/output device hosted by a local apparatus and coupling the application and the at least one remote input/output device hosted by another apparatus comprises buffering data for the at least one local input/output device and the at least one remote input/output device hosted by another apparatus.

18. An apparatus comprising:
at least one processor; and
at least one memory including computer program code the at least one memory and the computer program code configured to, with the at least one processor, cause the apparatus at least to perform:
coupling an application and at least one local input/output device hosted by a local apparatus but not coupling the application and at least one remote input/output device hosted by another apparatus;
in response to a proximity detection trigger, indicative that the another apparatus hosting the remote input/output device is available to be coupled to, coupling the application and at least one local input/output device hosted by a local apparatus and coupling the application and the at least one remote input/output device hosted by another apparatus,
wherein the at least one local input/output device comprises a first display and the at least one remote input/output device comprises a second, different display,
wherein the proximity detection trigger comprises a message produced in response to a proximity event,
wherein the message has a standard format for conveying characteristics of the remote input/output device hosted by the another apparatus,
wherein the characteristics of the remote input/output device hosted by the another apparatus comprise: position information, orientation information, display size information and display resolution information; and
generating a viewing map comprised of first content of the first display and second content of the second display, wherein the second content is different to the first content, wherein the viewing map is a logical display formed from a combination of at least the first content of the first display and the second content of the second display and wherein at least one of the first content and second content is dependent on the relative positions of the first display and the second display.

* * * * *